United States Patent
Hsieh et al.

(10) Patent No.: US 7,408,713 B1
(45) Date of Patent: Aug. 5, 2008

(54) STEP-PHASE INTERFEROMETRIC OPTICAL INTERLEAVER

(76) Inventors: Yung-Chieh Hsieh, 3176 Salem Dr., San Jose, CA (US) 95127; Chiayu Ai, 37057 Chestnut St., Newark, CA (US) 94560

( * ) Notice: Subject to any disclaimer, the term of this patent is extended or adjusted under 35 U.S.C. 154(b) by 472 days.

(21) Appl. No.: 10/338,465

(22) Filed: Jan. 8, 2003

Related U.S. Application Data

(60) Provisional application No. 60/346,708, filed on Jan. 8, 2002.

(51) Int. Cl.
*G02B 27/00* (2006.01)
*G01B 9/02* (2006.01)

(52) U.S. Cl. .................. 359/577; 356/452; 356/453

(58) Field of Classification Search .......... 359/583, 359/572, 579, 831, 883, 577; 356/489, 450, 356/456, 452, 453
See application file for complete search history.

(56) References Cited

U.S. PATENT DOCUMENTS

| | | | | |
|---|---|---|---|---|
| 4,411,492 A | * | 10/1983 | Bluege | 359/572 |
| 4,426,155 A | * | 1/1984 | Monchalin | 356/452 |
| 5,157,458 A | * | 10/1992 | Wagner et al. | 356/453 |
| 5,907,404 A | * | 5/1999 | Marron et al. | 356/489 |
| 6,115,401 A | * | 9/2000 | Scobey et al. | 372/100 |

OTHER PUBLICATIONS

Dingel et al., "Multifunction optical filter with a Michelson-Gires-Tournois interferometer for wavelength-division-multiplexed network system applications" Optics Letters, vol. 23, No. 14, 1998.

* cited by examiner

*Primary Examiner*—Audrey Y Chang
(74) *Attorney, Agent, or Firm*—Antonio R. Durando

(57) ABSTRACT

The cavity in the mirror arm of a conventional interleaver is replaced by a wedge integral with the beamsplitter structure of the interleaver. Thus, the light reflected from the AR-coated surface of the wedge is dispersed away from the optics of the device. The beam emerging from the wedge surface is directed toward a tilted mirror that reflects it totally on-axis. As a result of the diversion of the light reflected from the wedge surface and the non-parallel disposition of the wedge surface with respect to the mirror, phase errors are virtually eliminated. In another embodiment, a second wedge is used with a second antireflective surface disposed in parallel to the first wedge's antireflective surface, and with a mirror normal to the optical axis of the device.

8 Claims, 13 Drawing Sheets

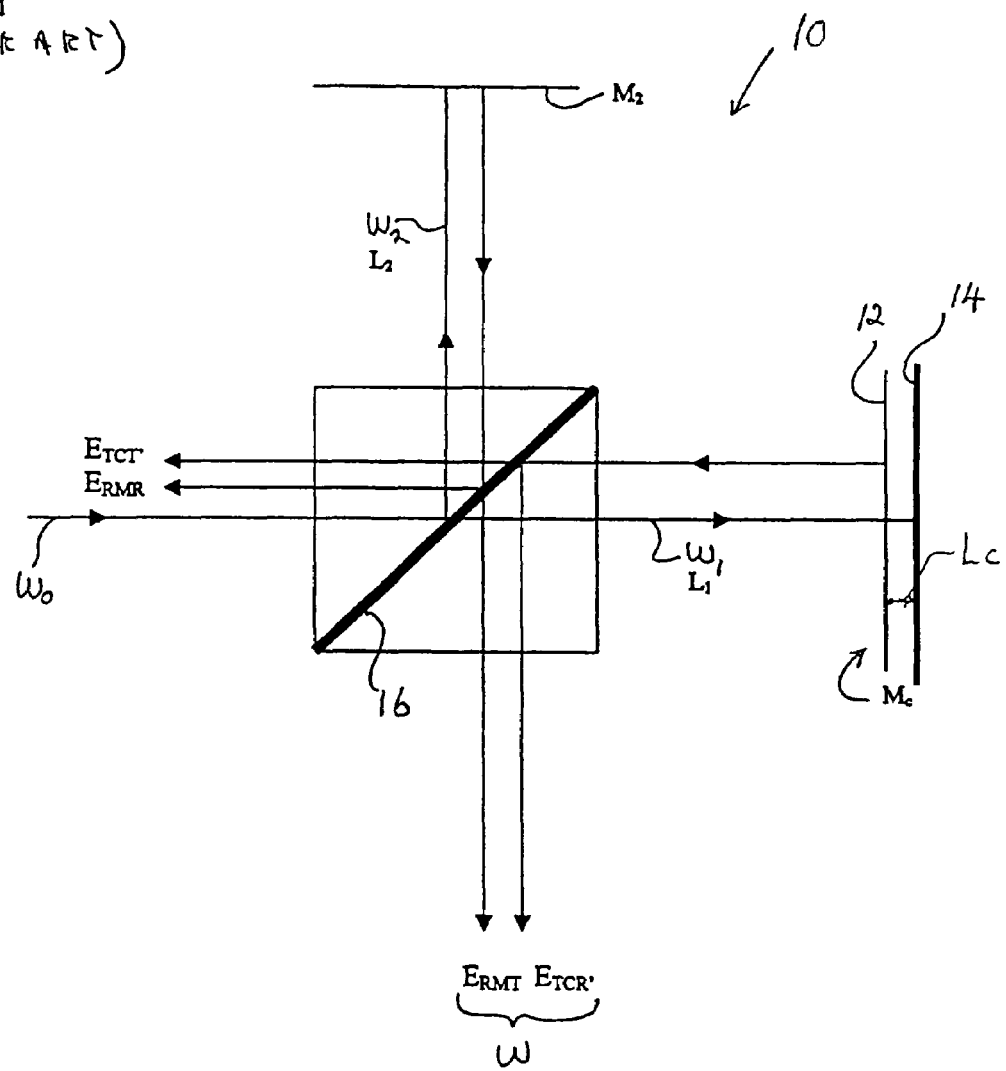

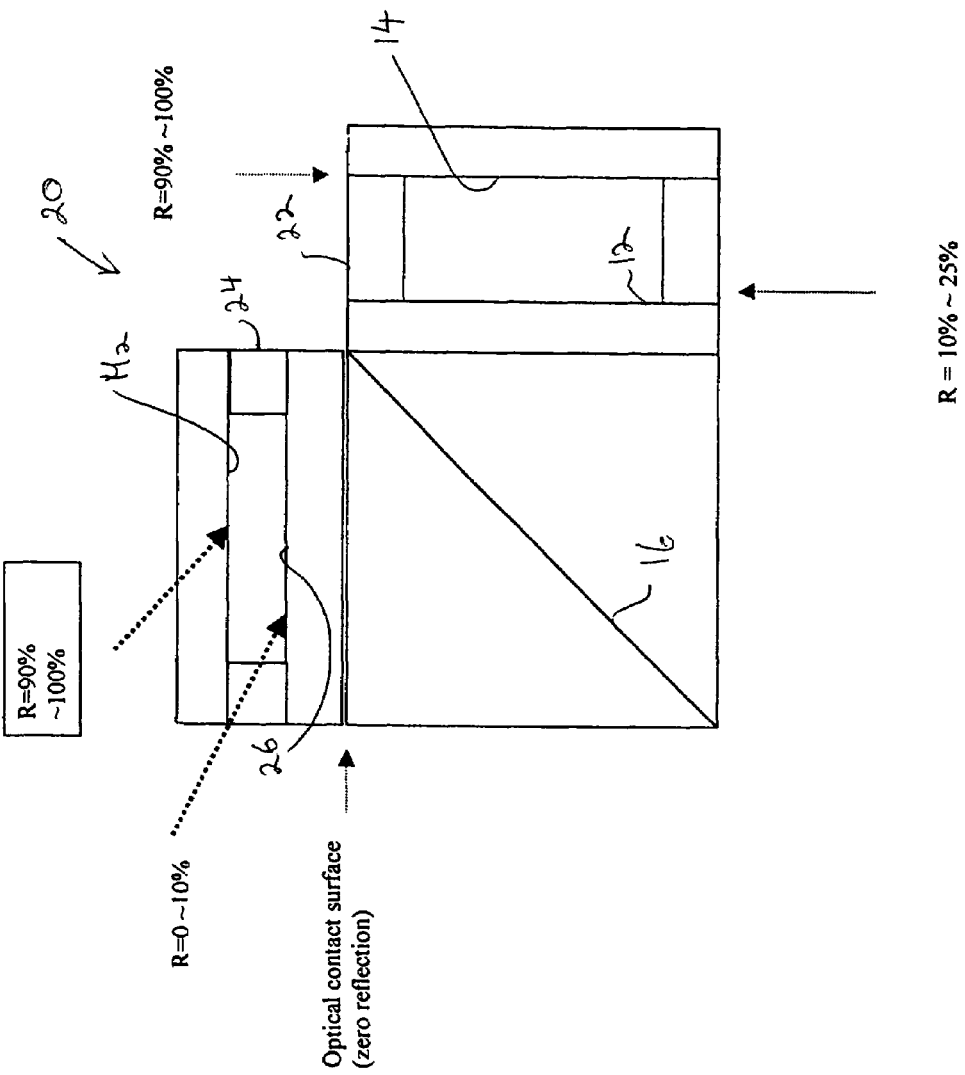
Figure 2. The prior art of MMIT interleaver (PRIOR ART)

Figure 3 Isolation vs. phase error within stop band
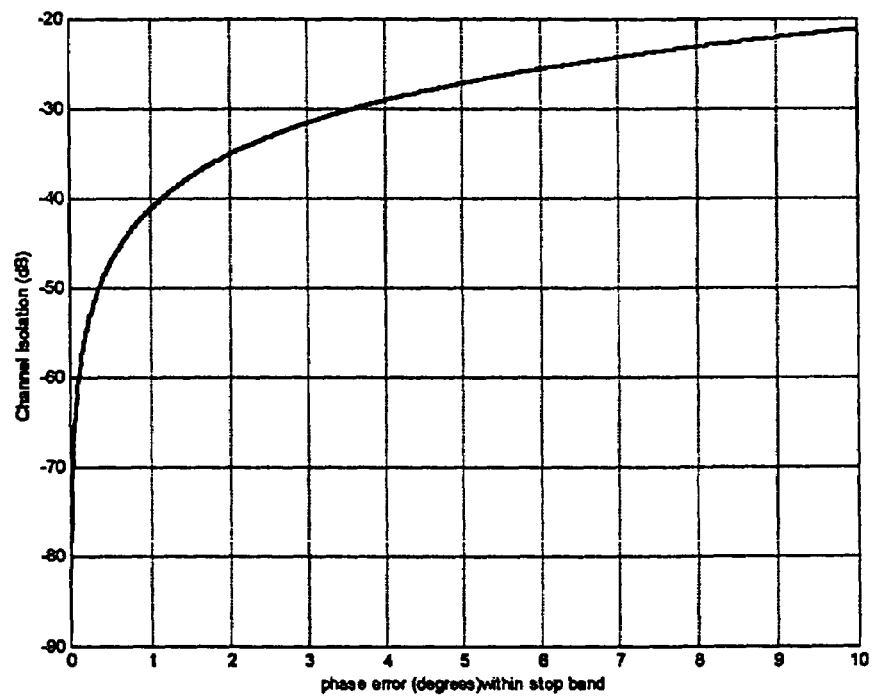

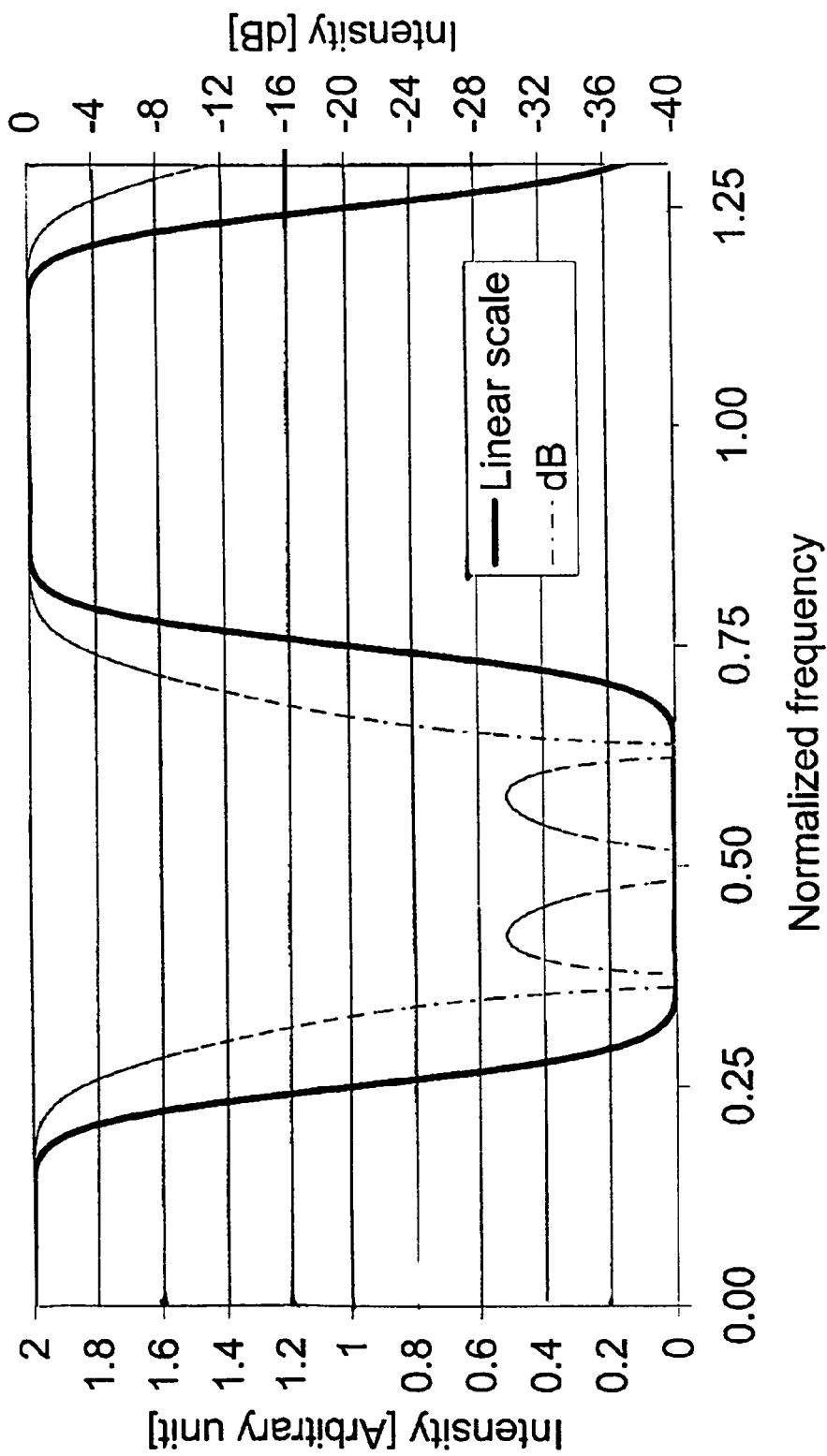
Firgure 3A Intensity vs. Normalized frequency when Rnp=0.18 and R=0

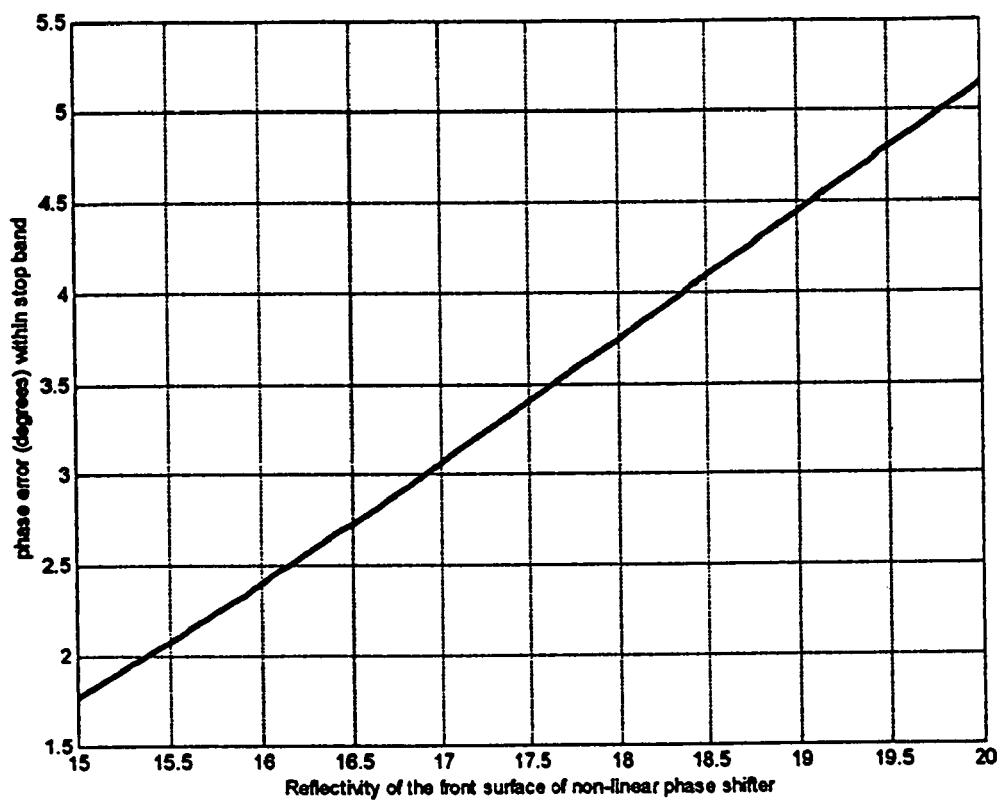
Figure 4: Phase error introduced by non-linear phase shifter

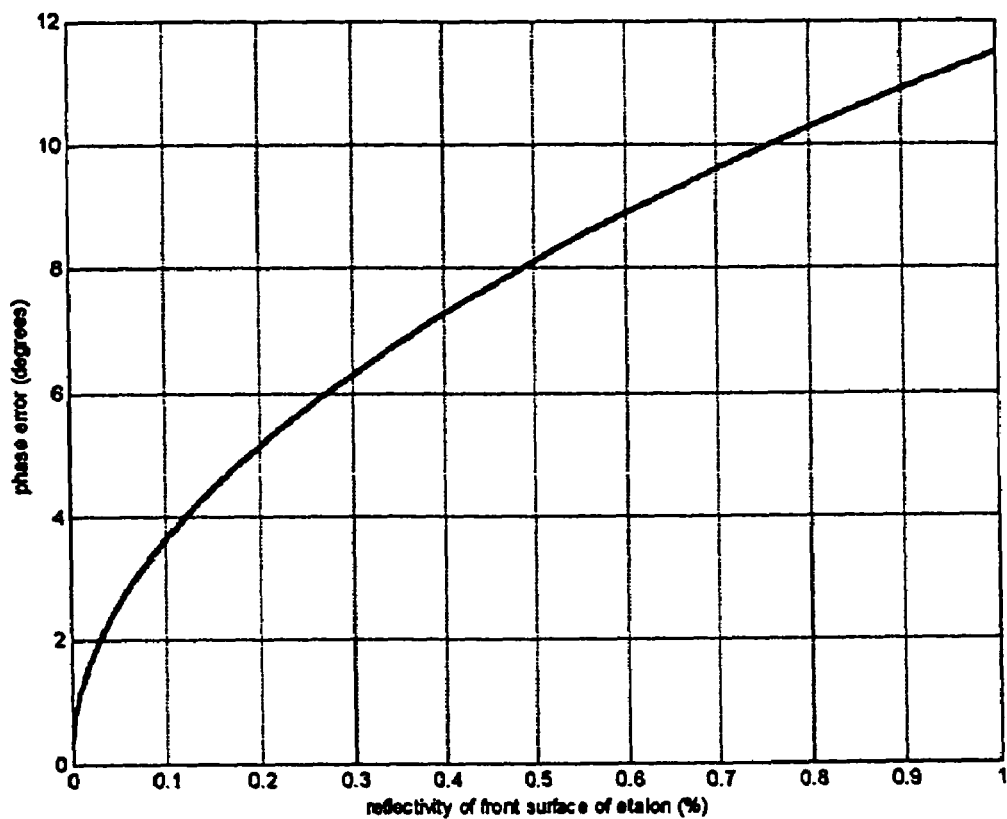
Figure 5, phase error introduced by the etalon vs. reflectivity

Figure 6, Isolation vs. reflectivity of etalon's front surface for R_np = 0.2
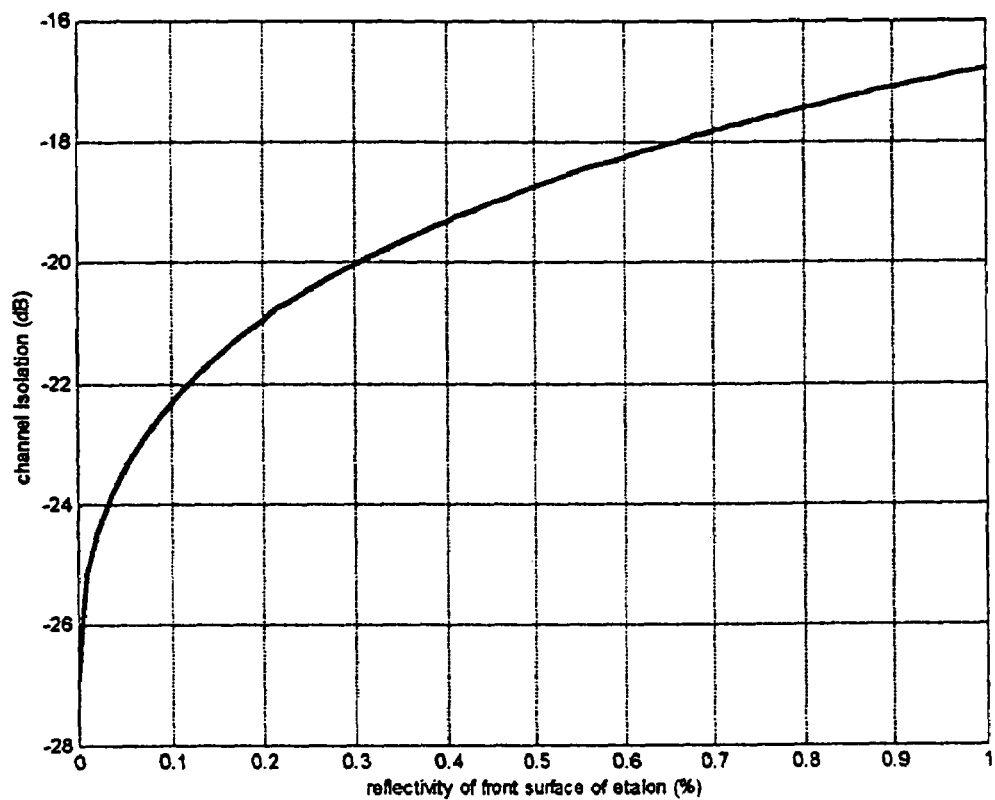

Figure 7 : A non-etalon MMI interleaver
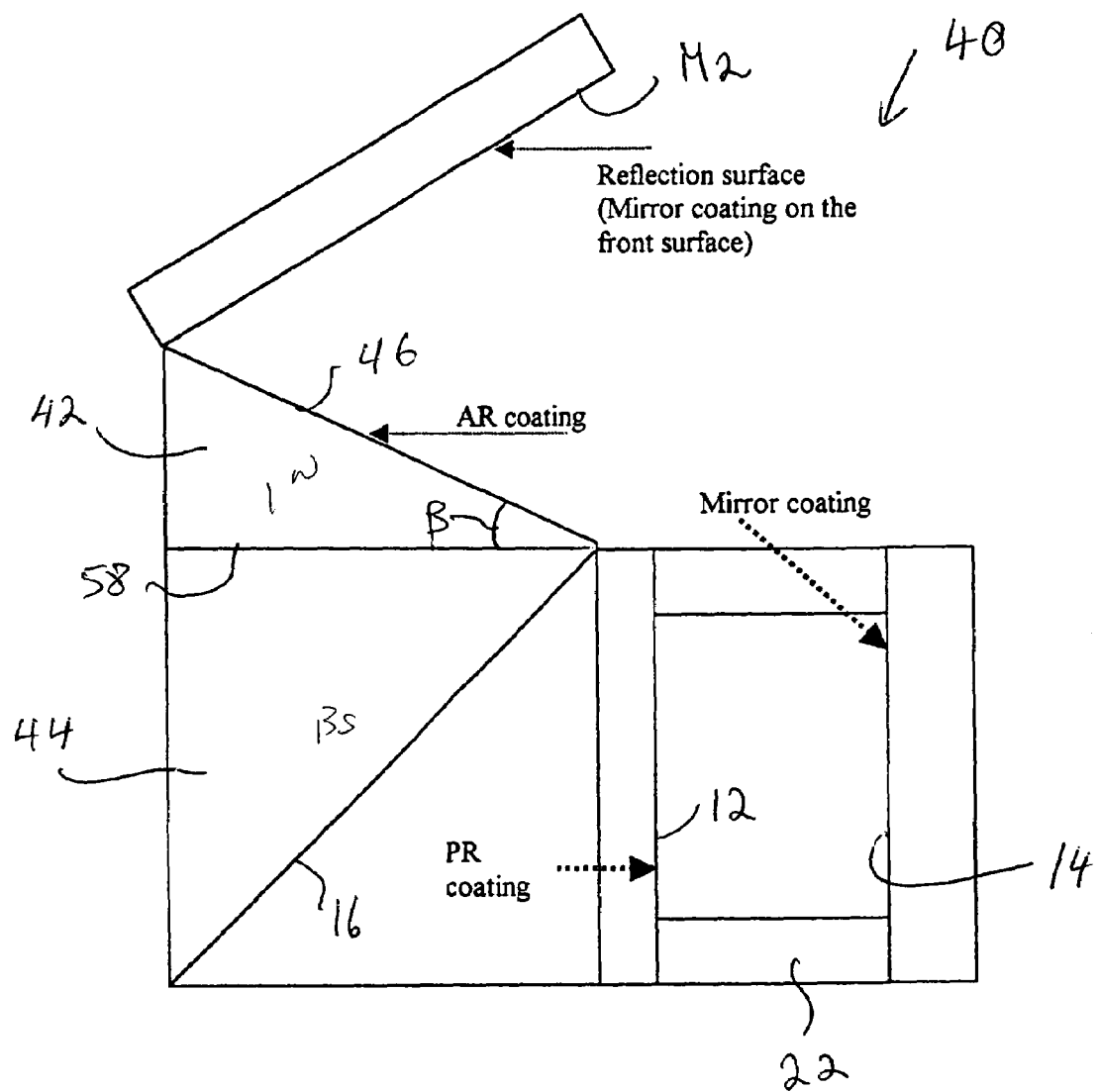

Figure 8 Ghost reflection in a MMI interleaver
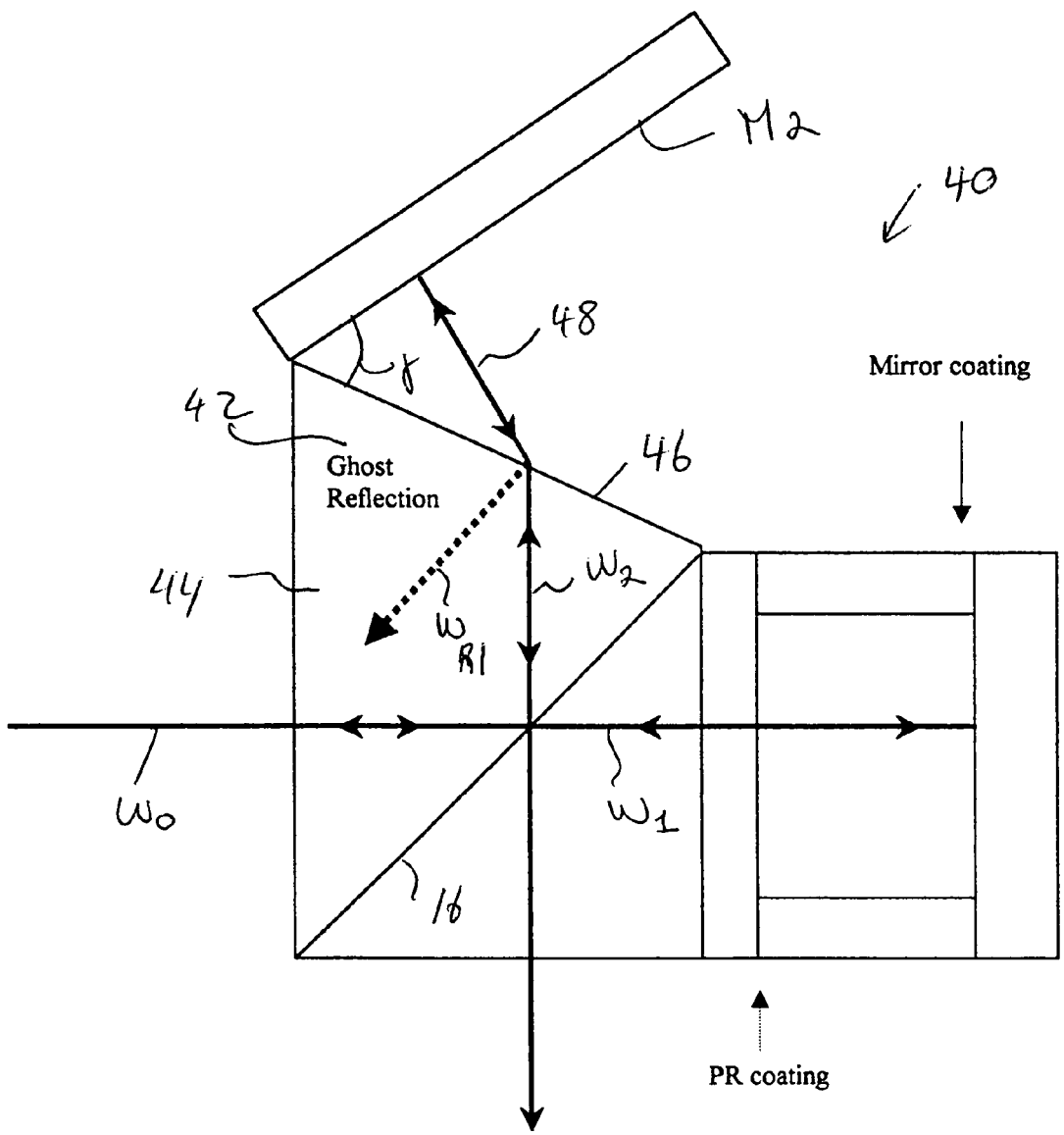

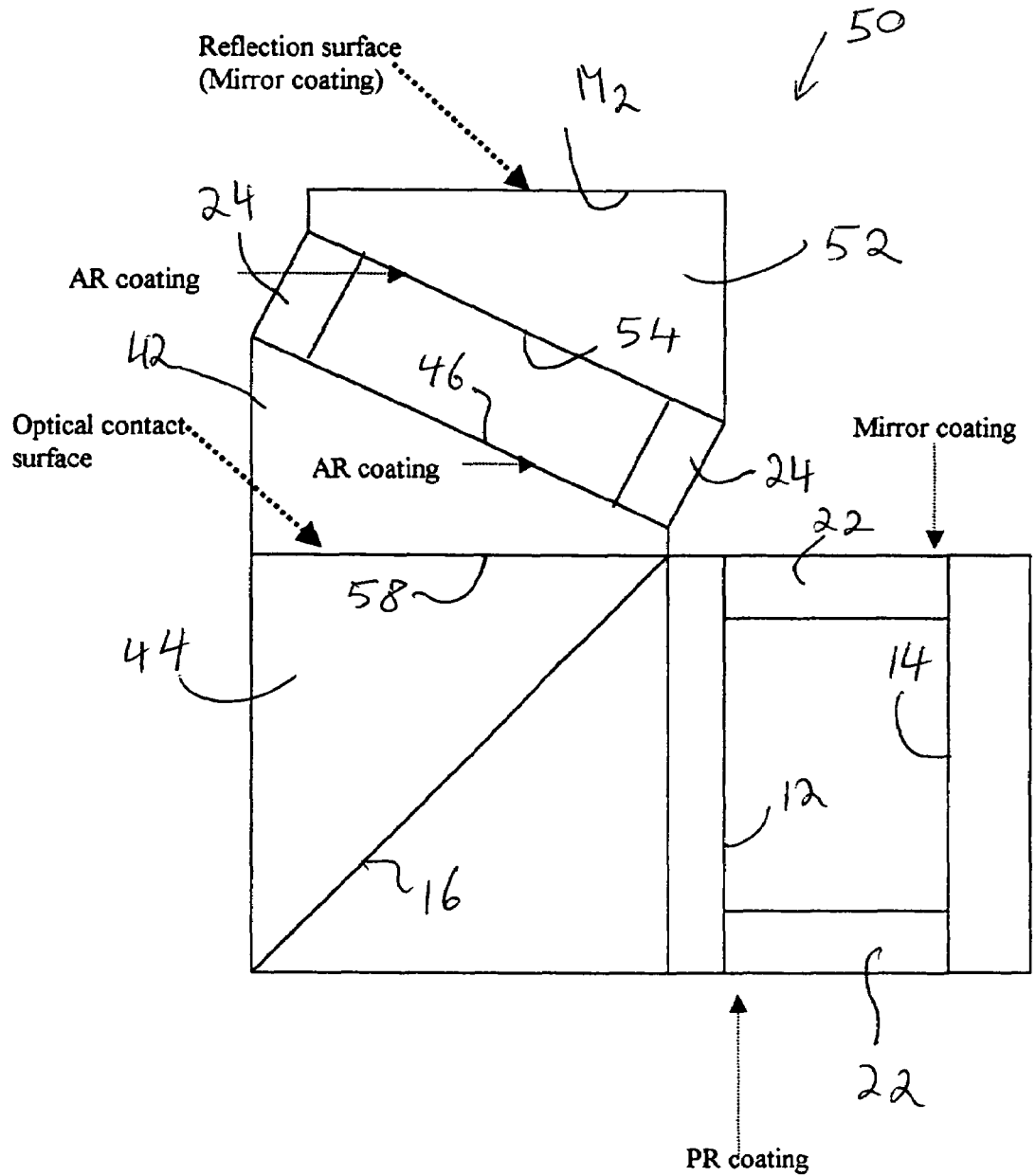
Figure 9 A non-etalon MMI interleaver

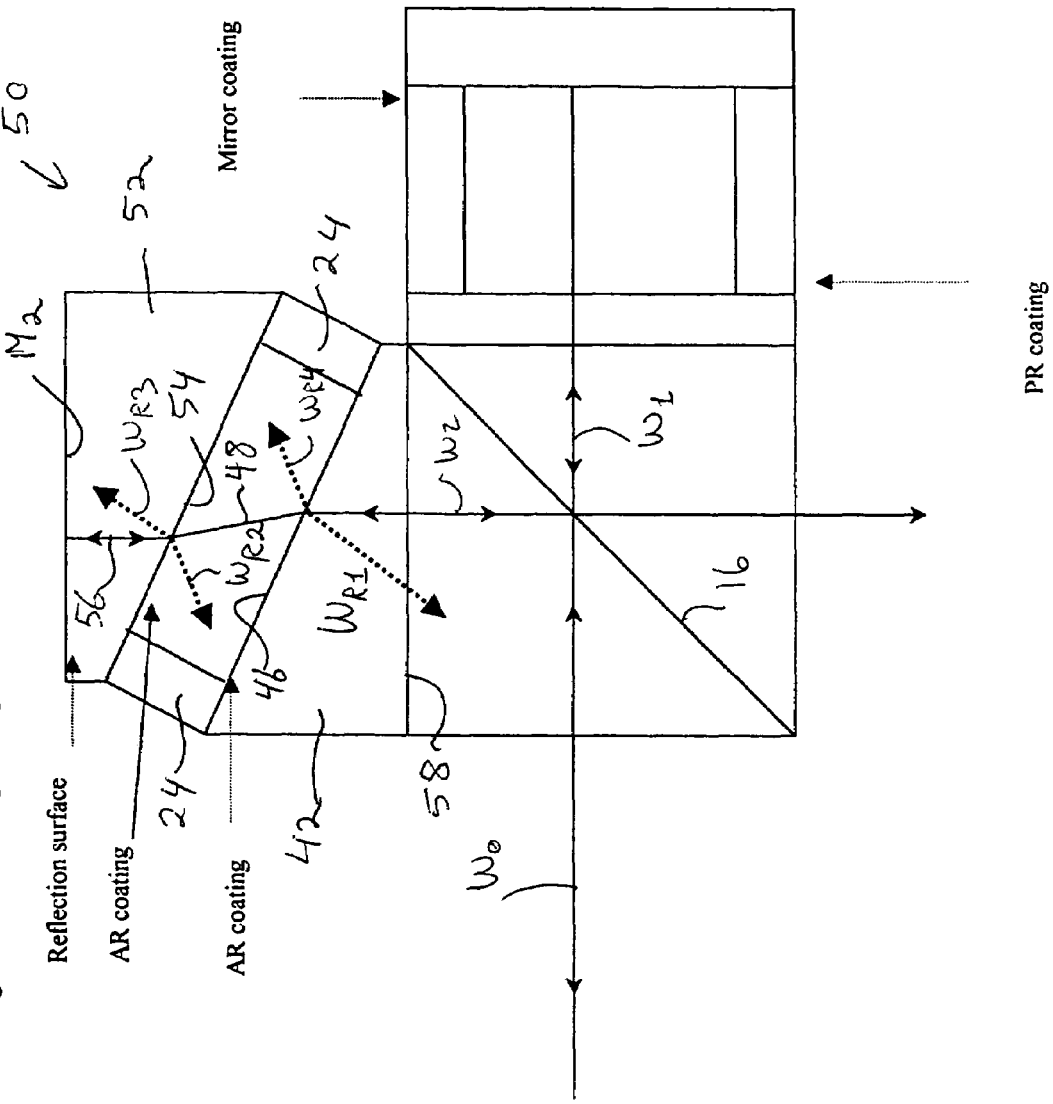
Figure 10: The optical path of a non-etalon MMI interleaver

Figure 11: A non-etalon reflector
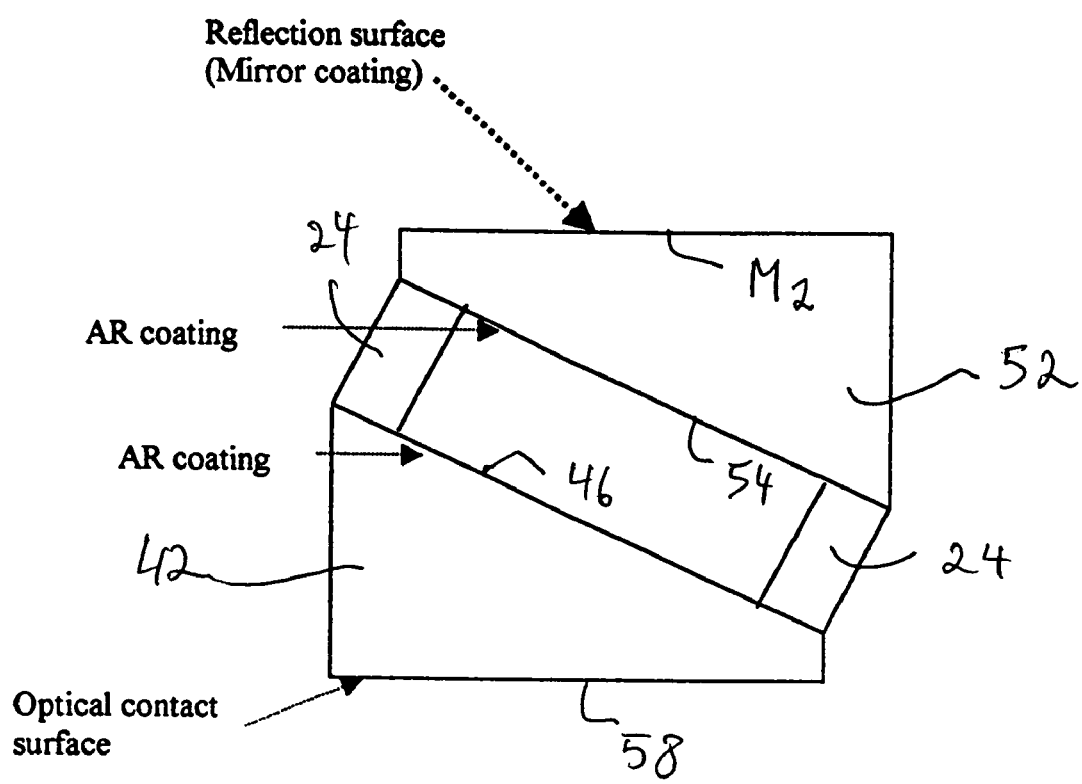

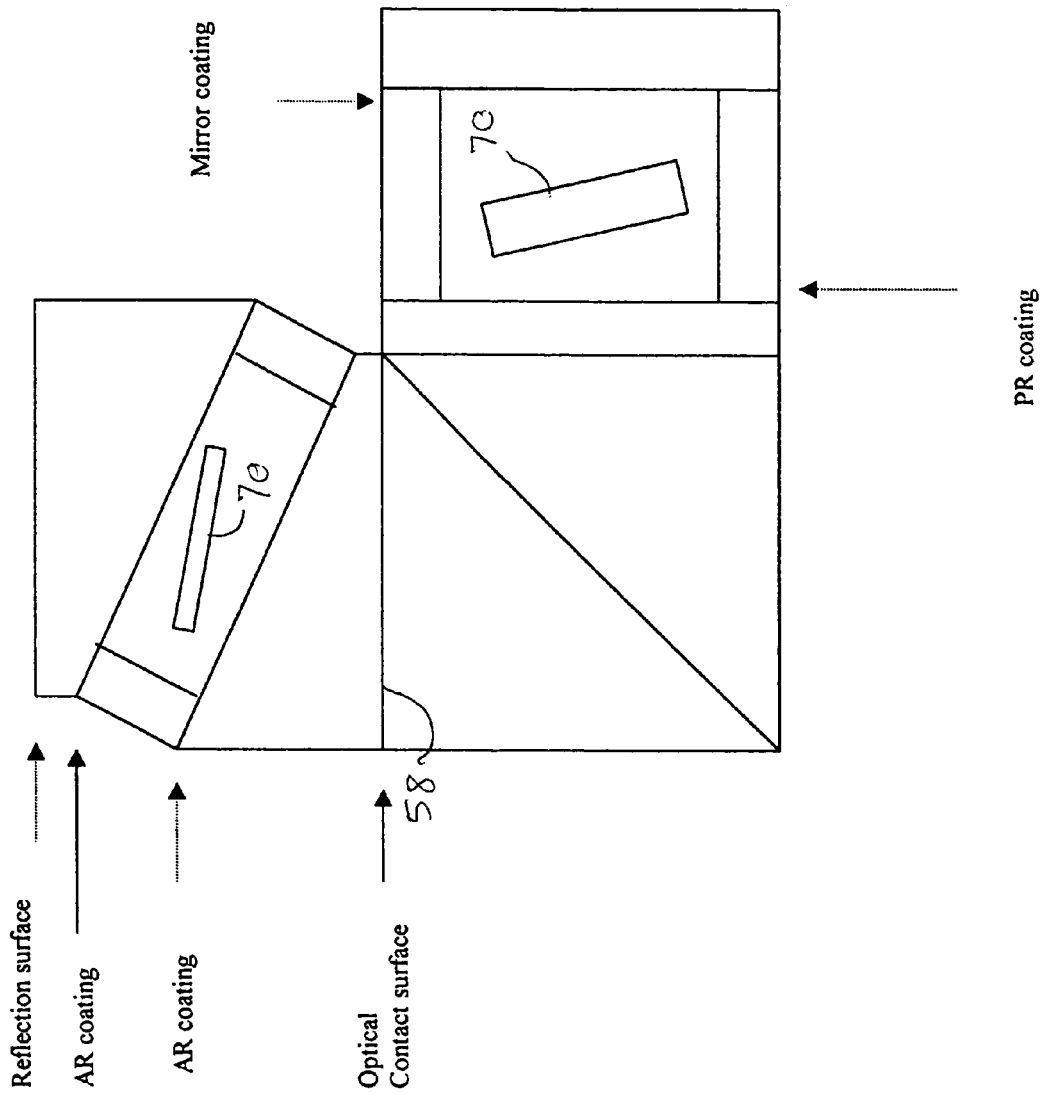
Figure 12 A non-etalon MMI interleaver with frequency fine-tuning window

STEP-PHASE INTERFEROMETRIC OPTICAL INTERLEAVER

RELATED APPLICATIONS

This application is based on U.S. provisional Ser. No. 60/346,708, filed Jan. 8, 2002.

BACKGROUND OF THE INVENTION

1. Field of the Invention

This invention pertains to the general field of optical communications and, in particular, to a step-phase interferometric optical interleaver.

2. Description of the Prior Art

Interferometric optical interleavers are commonly utilized in dense wavelength division multiplexing (DWDM) optical communication, where various frequencies ($1/\lambda$) of laser light are used as carrier signals (channels) and are coupled into the same optical fiber, which acts as a waveguide. Data signals are superimposed over the carrier signals and are transported in the waveguide. Thus, the information capacity is directly proportional to the number of channels in the fiber. Since the total usable wavelength range is limited (about a few tens of nanometers), as channel spacing decreases, more channels can fit into the same optical fiber and greater communication capacity is achieved.

Channel spacing is limited by the capability of the multiplexer (MUX) and the de-multiplexer (de-MUX). Currently, the standard channel spacing is 100 GHz (0.8 nm) and manufacturing costs increase dramatically to implement a channel spacing smaller than 100 GHz. Therefore, a cost-effective method for interleaving channels and enabling the use of higher bandwidth filters with lower channel spacing in an optical communication system would be very desirable. For example, a one-stage interleaver can be used with 100-GHz filters and a 50-GHz channel spacing. Similarly, a two-stage interleaver enables the use of 100-GHz filters in a 25-GHz channel-spacing communication system.

Interferometric interleaver devices used to separate communications channels into distinct optical signals are well known in the art. See, for example, U.S. Pat. Nos. 6,169,626, 6,268,951 and U.S. Pat. No. 6,275,322. These interleavers combine a beamsplitter with an etalon cavity (also known as a Gires-Tournois resonator or GTR) in a non-linear phase-shifter arm (the GTR arm) of the interleaver and a mirror in a reference arm (the mirror arm) to produce the necessary phase shift and interference effects. FIG. 1 illustrates schematically such a conventional step-phase interferometric interleaver. A multi-channel optical input $W_0$ is passed through a beam splitter 10 which splits the beam into a first wavefront $W_1$ transmitted toward a GTR device $M_c$ and a second wavefront $W_2$ reflected toward a mirror $M_2$. The GTR includes a front surface 12 and a parallel back surface 14 with very low and very high reflectance, respectively (which define a cavity also known in the art as an "etalon"). The GTR $M_c$ and the mirror $M_2$ are positioned at distances $L_1$ and $L_2$, respectively, from the interface 16 of the splitter 10. The GTR causes a phase shift in the wavefront $W_1$ which is returned to and partially reflected by the beamsplitter 10 to produce a beam $E_{TCR}$ in a first output arm of the step-phase interferometer and is partially transmitted to produce a beam $E_{TCT}$ in a second output arm of the interleaver. Similarly, the wavefront $W_2$ is reflected from the mirror $M_2$, is partially transmitted by the beamsplitter 10 to produce a beam $E_{RMT}$ in the first output arm, and is partially reflected to produce a beam $E_{RMR}$ in the second output arm of the interleaver. The notation used in this disclosure, wherein T, R, M and C refer to transmission, reflection, mirror and cavity (resonator), respectively, and the prime symbol (') refers to the internal optical path, is conventional in the art.

Several complicating factors limit the degree to which these interferometric interleavers can be utilized to increase communication capacity. For instance, the non-linear dependence of the optical phase on carrier frequency of the interleaver intrinsically introduces undesirable chromatic dispersion that reduces their usefulness. A solution to this problem is disclosed in commonly owned U.S. Ser. No. 10/267,216, hereby incorporated by reference, wherein a GTR is used to cancel chromatic dispersion in the passband of the device.

The proper functioning of optical interleavers is predicated upon the precise control of the optical-path lengths of the wavefronts traversing the device (L1 and L2 in FIG. 1), which are susceptible to variation as a result of manufacturing tolerances and thermal effects. U.S. Ser. No. 10/287,340, also incorporated by reference, provides a solution to this problem based on the use of a parallel glass plate mounted on a rotating fixture in the cavity of the interferometric interleaver. The glass plate refracts the incident optical signal to increase the length of its optical path as a function of the angle of incidence. Thus, the device can easily achieve a precision in the order of nanometers.

Another problem arises from the way interleavers are in fact manufactured in order to simplify the challenge of controlling precisely the optical-path length of each arm of the device. Rather than using a mirror as illustrated in FIG. 1 or a totally reflective surface on a solid block, each of which provides no flexibility in establishing the length of the optical path $L_2$, a cavity with spacers is used. As illustrated in FIG. 2, the structure of such a conventional interleaver device 20 consists of two air spaces between a transparent body incorporating the beamsplitter interface 16 and the reflective mirrors $M_2$ and 14 (see FIG. 1 also). These air spaces are varied to set the cavity length $L_c$ and the distance of the mirror $M_2$ from the beamsplitter interface 16 such that the mirror's distance L, from the interface is equal to the distance from the interface to the middle of the GTR's cavity; that is, $L_2=L_1-1/2L_c$. Accordingly, a first set of spacers 22 determines the distance between the two etalon surfaces 12 and 14. A second set of spacers 24 establishes the distance $L_2$ between the beam splitter interface 16 and the mirror $M_2$, thereby also setting the optical-path difference $L_2-L_1$. Thus, in practice the mirror arm of the interleaver is also implemented with a cavity structure and the reflectivity of the front surface 26 is critical to the proper functioning of the interleaver. Ideally, the surface 26 should be totally transmissive, which would produce the same effect as the mirror of FIG. 1. In practice, a reflectivity of less than 10 percent is tolerated because of limits in the effectiveness of antireflective coatings, but a corresponding phase error is introduced that severely limits the use of interleavers to improve the capacity of optical communication systems.

As those skilled in the art would readily recognize, in the pass band of optical frequency processed by an interferometric interleaver, the two beams are in phase, causing constructive interference. In the stop band of the optical frequency, the two beams are out of phase and, therefore, interfere destructively. Channel isolation depends on how well destructive interference is achieved. If the interfering beams are exactly out of phase within the stop band (i.e., with a phase difference of 180 degrees), the resulting isolation is perfect. However, any variation from 180-degree in the phase difference between the two interfering beams (herein defined as "phase error") significantly degrades the performance of the interleaver. The dependence of channel isolation on phase error is given by the relation $$\text{Channel Isolation} = 10 * \log_{10}\left[\sin^2\left(\frac{\phi_{error}}{2}\right)\right] \quad (1)$$

where $\phi_{error}$ is phase error in radians; and Channel Isolation is defined as the ratio of the residual power to the input power in the stop band, measured in dB. This relation is illustrated graphically in FIG. 3.

In current communication systems, the typical acceptable channel isolation is about 27 dB. Accordingly, the graph of FIG. 3 shows that a maximum phase error of 5 degrees is acceptable, which is very difficult to achieve with traditional interleaver construction. It is well known that a GTR or any etalon cavity structure introduces a nonlinear phase. For an interleaver of the type shown in FIG. 1 (see also B. Dingel et al., "Multifunction optical filter with a Michelson-Gires-Tournois interferometer for wavelength-division-multiplexed network system applications," Optics Letters, Vol. 23, No. 14, 1998), the phase difference between the beams reflected by the GTR and the Mirror $M_2$ is nearly 180 degrees in the stop band and, therefore, the two beams interfere destructively. The phase difference in the pass band is nearly in phase; thus, they interfere constructively. Any deviation from 180 degrees produces a residual power in the stop band, as illustrated by the intensity plots of FIG. 3A. The local peaks in the stop band determine the channel isolation of the device. The phase error corresponding to the local peak is a local extreme and is given by the relation $$\phi_{NP} = 2\tan^{-1}\left[\sqrt{\frac{\alpha(1-2\alpha)}{(2-\alpha)}}\right] - \tan^{-1}\left[\sqrt{\frac{(1-2\alpha)}{\alpha(2-\alpha)}}\right], \text{ where} \quad (2)$$

$$\alpha = \frac{1-\sqrt{R_{NP}}}{1+\sqrt{R_{NP}}},$$

and '$R_{NP}$ is the reflectivity of the front surface 12 of the cavity in the GTR. Usually, to obtain wide enough pass-bandwidth, the reflectivity $R_{NP}$ must be in 0.15 to 0.2 range. FIG. 4 shows the phase error introduced by the non-linear phase shifter as a function of the front-surface reflectivity. The illustrated by the graph, a reflectivity RNP of 0.2 produces the maximum allowable phase error of 5 degrees.

In interleavers constructed with an etalon cavity in the mirror arm, as illustrated in FIG. 2, an additional phase error is introduced by the etalon as a result of multiple-reflection effects, in addition to the intrinsic phase error $\phi_{NP}$. This phase error at the extreme (because its extreme values affect channel isolation) is given by the relation $$\phi_{etalon} = 2\tan^{-1}\left[\frac{1}{2}\left(\sqrt{\left(\frac{1+\sqrt{R}}{1-\sqrt{R}}\right)} - \sqrt{\left(\frac{1-\sqrt{R}}{1+\sqrt{R}}\right)}\right)\right], \quad (3)$$

where R is the reflectivity of the etalon's front surface 26. It should be noted that both cavities in the interleaver of FIG. 2 experience the effect of multiple reflections. Each phase error is measured with respect to the same mirror $M_2$. Due to the location of this mirror, and the corresponding difference in optical paths, the phase-error equations are correspondingly different for each cavity. FIG. 5 is a plot of this phase error as a function of front-surface reflectivity. It is noted that a reflectivity of 0.25% produces a phase error of about 6 degrees, which degrades channel-isolation performance to an unacceptable degree.

Thus, the total phase error of a conventional interleaver (FIG. 2) within its stop band is given by the sum of the respective contributions from both arms of the device, as follows $$\phi_{error} = |\phi_{NP}| + |\phi_{etalon}|. \quad (4)$$

FIG. 6 illustrates the dependence of channel isolation on the reflectivity of the etalon's front surface 26 when the GTR has a front surface 12 with a reflectivity $R_{NP}$ of 20% The graph shows that channel isolation is degraded by about 7 dB by a change in AR coating from zero to about 0.25% reflectivity. At 0.25% reflectivity, the isolation is only −20.5 dB, which is well below the typical requirement of 27 db in today's telecommunication system. In order to achieve the desired performance from a conventional interleaver, the etalon's front surface 26 has to exhibit a reflectivity better than 0.01% (−25.2 dB). This is almost impossible to implement with existing AR coatings.

To the extent that the resonator cavity $M_c$ (see FIG. 1) is necessary to the function of an interferometric interleaver, the corresponding phase error is unavoidable. On the other hand, to the extent that a cavity structure is used for practical reasons only to precisely place the mirror $M_2$, its contribution of ghost reflections from the front surface 26 of the etalon diminishes the usefulness of interferometric interleavers for channel isolation. Unfortunately, antireflective (AR) coatings are not sufficiently effective to control the reflectivity of a surface to the degree necessary to precisely control phase error. Therefore, there is still a need for an interferometric interleaver that minimizes the introduction of phase error as a result of its configuration, rather than through the use of AR coatings. The present invention provides simple solutions to that end.

BRIEF SUMMARY OF THE INVENTION

This invention is based on the idea of reducing the contribution to phase error in an interferometric interleaver by diverging from the optical path any reflection from the front surface of the mirror arm and by removing the etalon effect produced by the front surface and the parallel mirror. Thus, according to one aspect of the invention, the conventional cavity in the mirror arm of the interleaver is replaced by an optical wedge either in optical contact or integral with the beamsplitter structure of the interleaver. Thus, the light from the splitter is directed toward an AR-coated surface of the wedge at an interface with air. As a result of the angle introduced by the wedge, the light reflected from the splitter strikes the wedge's surface at a non-zero angle of incidence and, to the extent the surface exhibits any reflectivity, it produces a corresponding off-axis reflected beam that is dispersed away from the optics of the device. Therefore, the contribution to phase error due to the reflectivity of the front surface of the cavity in conventional construction is virtually eliminated.

The beam emerging from the wedge surface is refracted by the glass/air interface. According to another aspect of the invention, the mirror is tilted with respect to the wedge surface at such an angle that the beam emerging from the wedge is reflected totally on-axis by the mirror and returned to the point of emergence in the wedge surface, where it is again refracted at the air/glass interface and returned to the beamsplitter along the optical path of the mirror arm of the interleaver. As a result of the non-parallel disposition of the wedge surface and the mirror, the multiple-reflection contribution of the conventional etalon structure to the phase error is also virtually eliminated.

In another embodiment of the invention, the conventional cavity configuration of the mirror arm of the interleaver is retained, but the cavity is incorporated at an angle with respect to both the beamsplitter and the mirror. Building on the same optical wedge configuration of the first embodiment, a second optical wedge is used with an AR-coated surface that defines a cavity in combination with the first wedge's AR-coated surface, and with a reflective surface to provide the mirror of the interleaver. Spacers between the AR-coated surface of the first wedge and the AR-coated surface of the second wedge are used to set the optical-path length of the mirror arm to the required value. Thus, the light from the beamsplitter that is reflected at the front surface of the cavity is dispersed away from the optical path of the device, as in the case of the first embodiment. The light emitted from the front surface is refracted in air toward the AR-coated back surface of the cavity at a non-zero angle of incidence to ensure, to the extent that such surface also exhibits any reflectivity, that it produces an off-axis reflected beam that is also dispersed away from the optics of the device. The mirror surface of the second wedge is positioned at an angle with respect to the AR-coated back surface such that the emergent beam therefrom is nearly normal to and therefore reflected substantially on-axis by the mirror-and returned to the point of emergence in the AR-coated back surface, where it is sequentially refracted at the glass/air interface of the back surface and the air/glass interface of the AR-coated front surface, and then returned to the beamsplitter along the optical path of the mirror arm of the interleaver. Again, as a result of the lack of multiple reflections in the cavity formed between the two wedges of the invention, the etalon-structure contribution to phase error is virtually eliminated. Therefore, a broad benefit of this invention is a novel structural interleaver configuration that affords the precise control of the phase shift required for maximizing channel isolation.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

BRIEF DESCRIPTION OF THE DRAWINGS

FIG. 1 illustrates schematically an interleaver device based on a step-phase interferometer.

FIG. 2 is a schematic representation of the structural components of a conventional interleaver that utilizes spacers to establish the length of the etalon cavity and the optical-path difference between the two arms of the device.

FIG. 3 is a graph of the relationship between channel isolation and phase error in an interferometric optical interleaver.

FIG. 3A illustrates typical plots of light intensity versus normalized frequency in an interleaver.

FIG. 4 is a graph showing the relationship between the phase-error component introduced by the non-linear phase shifter in the GTR arm of an interleaver and the reflectivity of its front surface.

FIG. 5 is a graph showing the relationship between the phase-error component introduced by the etalon in the mirror arm of a conventional interleaver and the reflectivity of its front surface.

FIG. 6 is a graph showing the relationship between channel isolation and the front-surface reflectivity of the etalon cavity in the mirror arm of a conventional interleaver, as shown in FIG. 2, when $R_{NP}$ is 0.2.

FIG. 7 is a schematic representation of a first embodiment of the invention which combines a wedge and a tilted mirror to eliminate phase errors produced by the mirror arm of a conventional interleaver.

FIG. 8 is the embodiment of FIG. 7 showing the optical path of the device and the direction of dispersed reflected light.

FIG. 9 is a schematic representation of a second embodiment of the invention which combines two wedges and a tilted cavity to eliminate phase errors produced by the mirror arm of a conventional interleaver.

FIG. 10 is the embodiment of FIG. 9 showing the optical path of the device and the direction of dispersed reflected light.

FIG. 11 is a schematic representation of the preferred embodiment of the non-etalon reflector portion of the interleaver of FIG. 9.

FIG. 12 illustrates a frequency window used to control the optical-path length in each arm of the interleaver of FIG. 9.

DETAILED DESCRIPTION OF THE INVENTION

The invention lies in providing an novel interleaver structure that virtually eliminates the phase errors introduces by the prior-art configuration of the mirror arm of the interleaver. Referring to FIG. 7 of the drawings, wherein like parts are designated throughout with like numerals and symbols, a non-etalon mirror-arm interleaver 40 is illustrated according to the invention. The GTR arm of the interleaver (that is, the parallel surfaces 12,14 and the cavity between them) is unchanged from conventional construction. In the mirror arm, on the other hand, the cavity defined by the surface 26 and the mirror $M_2$ (FIG. 2) is eliminated and replaced by an optical wedge 42 in optical contact with the beamsplitter structure 44, so as to achieve a condition of zero reflection between the two. Equivalently, the wedge 42 may be constructed as an integral part of the beamsplitter structure. The surface 46 of the wedge 42 is treated with an AR coating, as in conventional devices, in order to minimize reflection and optimize efficiency of operation. As shown in FIGS. 7 and 8, the angle β provided by the wedge to the surface 46 ensures that the beam $W_2$ reflected by the beamsplitter interface 16 along the optical path of the device is not normal to the surface 46. Accordingly, any light $W_{R1}$ reflected by the surface as a result of its undesirable, non-zero reflectivity is directed away from the optical path of the device and dispersed, as illustrated in FIG. 8. As a result, the phase error produced by the reflectivity of the surface 46, which in conventional interleavers forms the front surface of the mirror-arm cavity, is eliminated.

The portion 48 of the mirror-arm beam $W_2$ that is transmitted through the surface 46 is refracted in the air (or other medium placed in contact with the wedge 42) at an angle that depends on the properties of the materials. In order to retain the mirror function of the interleaver, the mirror $M_2$ is therefore placed substantially perpendicular to the refracted beam 48; that is, at an angle y with respect to the surface 46 that ensures a near-zero angle of incidence and total reflection of the beam 48 along the optical axis of the device. Obviously, the mirror $M_2$ is also placed at the appropriate distance to produce the desired phase shift for its interleaver function. Thus, parallel surfaces are eliminated from the optical path in the mirror arm of the interleaver. Accordingly, phase errors produced by multiple reflections are also eliminated.

According to another embodiment 50 of the invention, the multiple-reflection contribution to the phase error of a conventional interleaver is achieved by eliminating the presence of parallel surfaces normal to the optical path of the device. As illustrated in FIG. 9, spacers 24 are used to create a cavity between the emerging surface 46 of the wedge 42 and a second optical wedge 52 that includes an AR-coated surface 54 and a totally reflective (mirror) surface $M_2$. As illustrated in FIG. 10, so long as the beam 48 is not normal to the AR surface 54, any reflected light $W_{R2}$ is also dispersed away from the optical path of the device. The light beam 56 refracted at the air/glass interface of the AR surface 54 is directed toward the mirror surface $M_2$ at a near-zero angle of incidence (i.e., substantially normal to the mirror), so that the beam is totally reflected along the device's optical axis.

It is clear that the return beam from the mirror $M_2$ follows the device's optical path back to the beamsplitter. Any reflections $W_{R3}$ and $W_{R4}$ from the AR surfaces 54 and 46, respectively, are similarly diverted from the optical path and dispersed in the media. Thus, the conditions that contribute to the phase errors of the optical interleaver are removed.

FIG. 11 is a schematic representation of the non-etalon reflector that is the novel component of the interleaver embodiment 50 of FIG. 9. It is noted that the AR surfaces 46 and 54 are shown as parallel to one another in the figures. In such a case, if the material used for the wedges 42 and 52 is the same, it will necessarily follow that the mirror $M_2$ will be parallel to the entrant surface 58 of the wedge 42 (and also substantially perpendicular to the original direction of the beam $W_2$ reflected by the beamsplitter). On the other hand, these conditions are not necessary to practice the invention. As those skilled in the art would readily understand, the only critical conditions are the non-zero angle of incidence of the beams $W_2$ and 48 to the AR surfaces 46 and 54, respectively, and the near-normal incidence of the beam 56 (as well as beam 48 in the embodiment of FIG. 8) to the mirror $M_2$.

Because any undesirable reflection has been eliminated from the optical path of the mirror arm, the interleaver of the invention can be manufactured advantageously using conventional AR coatings (e.g., with reflectivity of about 0.25%). Comparing the embodiments of FIG. 7 and FIG. 9, it is clear that the latter implementation, through the use of spacers 24, affords the same degree of control over the optical-path length of the mirror arm of the interleaver as provided by the prior-art (see FIG. 2). Accordingly, it is preferred. This feature is important because the performance of an interleaver, in terms of both channel isolation and spectrum accuracy relative to ITU grid, depends heavily on the ability to set the optical-path length of both the resonator and mirror arms with an accuracy of a few nanometers. Furthermore, the preferred structure enables the simple addition of a frequency window in either or both of the arms, as illustrated in FIG. 12. A rotating window 70 of the type disclosed in Ser. No. 10/287,340 would be perfectly suitable to change the optical-path length of either arm with sub-nanometer accuracy.

It is noted that the invention has been described throughout in terms of a beam striking the reference mirror $M_2$ perpendicularly or nearly perpendicularly in order to return the reflected beam along the optical axis of the incident beam in the mirror arm of the interleaver. As those skilled in the art would readily recognize, though, this is not a limitation of the invention. As illustrated in FIG. 1, the return beam could be directed off-axis and the function of the invention could be retained with the same general structure so long as the return beam is appropriately combined at the beamsplitter interface 16 with the beam returned from the GTR arm of the interleaver. In such a case, both the optical-path lengths and the directions of the beams would need to be adjusted to account for the angle of incidence on the mirror $M_2$.

Thus, while the invention has been shown and described in what are believed to be the most practical and preferred embodiments, it is recognized that departures can be made therefrom within the scope of the invention. For example, transparent materials other than air could be used in equivalent fashion between the wedge and the mirror of FIG. 7 and between the wedges of FIG. 9. Therefore, the invention is not to be limited to the details disclosed herein, but is to be accorded the full scope of the claims so as to embrace any and all equivalent apparatus and methods.

What is claimed is:

1. A device for reducing a phase error resulting from reflections produced by antireflective surfaces in a mirror arm of an interferometric optical interleaver, comprising:
    a first optical wedge with a first antireflective surface disposed at a non-zero angle of incidence with respect to a beam traveling along an optical axis of said mirror arm; and
    a second optical wedge with a second antireflective surface and with a reflective surface, wherein said second antireflective surface faces the first antireflective surface and said reflective surface is disposed at a predetermined optical-path distance from the first antireflective surface and substantially normal to an incident beam propagated from said second antireflective surface along said optical axis of the mirror arm.

2. The device of claim 1, wherein said first optical wedge is in optical contact with a beamsplitter structure of said interleaver.

3. The device of claim 1, wherein said first optical wedge is integral with a beamsplitter structure of said interleaver.

4. The device of claim 1, wherein said first and second antireflective surfaces are parallel.

5. The device of claim 1, wherein said first and second optical wedges are made of the same material.

6. The device of claim 1, further comprising spacers defining an optical cavity between said first and second antireflective surfaces.

7. The device of claim 6, further comprising a frequency window in said cavity.

8. A method for reducing phase error resulting from reflections produced by antireflective surfaces in a mirror arm of an interferometric optical interleaver, comprising the steps of:
    placing an first optical wedge with a first antireflective surface disposed at a non-zero angle of incidence with respect to a beam traveling along an optical axis of said mirror arm; and
    placing a second optical wedge with a second antireflective surface facing the first antireflective surface, said second optical wedge also having a reflective surface disposed at a predetermined optical-path distance from the first antireflective surface and substantially normal to an incident beam propagated from said second antireflective surface along said optical axis of the mirror arm.

* * * * *